(12) United States Patent
Tsuchikiri et al.

(10) Patent No.: US 9,087,421 B2
(45) Date of Patent: Jul. 21, 2015

(54) DIAGNOSIS APPARATUS WHICH SUPPORTS FAULT REPRODUCTION, AND METHOD OF OUTPUTTING FAULT REPRODUCTION DATA

(75) Inventors: Hideyuki Tsuchikiri, Tokyo (JP); Yasushi Sato, Tokyo (JP); Jiro Aihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 13/256,940

(22) PCT Filed: Mar. 9, 2010

(86) PCT No.: PCT/JP2010/001672
§ 371 (c)(1),
(2), (4) Date: Nov. 28, 2011

(87) PCT Pub. No.: WO2010/116610
PCT Pub. Date: Oct. 14, 2010

(65) Prior Publication Data
US 2012/0065833 A1    Mar. 15, 2012

(30) Foreign Application Priority Data
Apr. 6, 2009 (JP) .................. 2009-092075

(51) Int. Cl.
*G01M 17/00*   (2006.01)
*G07C 5/08*    (2006.01)
*B60W 50/02*   (2012.01)

(52) U.S. Cl.
CPC .............. *G07C 5/0808* (2013.01); *G01M 17/00* (2013.01); *G07C 5/0816* (2013.01); *B60W 50/0205* (2013.01); *G07C 5/0825* (2013.01)

(58) Field of Classification Search
CPC ............ B60W 50/02; B60W 50/0205; B60W 50/0225; G01M 17/00; G01M 17/007; G01M 99/008; G07C 5/0808; G07C 5/0816

USPC .................... 701/29.1, 29.3, 31.8, 32.1, 32.9
See application file for complete search history.

(56) References Cited

U.S. PATENT DOCUMENTS

| 7,031,878 | B2 | 4/2006 | Cuddihy et al. |
| 7,260,501 | B2 * | 8/2007 | Pattipatti et al. ............. 702/183 |

(Continued)

FOREIGN PATENT DOCUMENTS

| JP | 01-210840 | 8/1989 |
| JP | 2805958 | 7/1998 |
| JP | 2006-349428 | 12/2006 |

OTHER PUBLICATIONS

"A Painless Look at Using Statistical Techniques to Find the Root Cause of a Problem" at http://www.processexcellencenetwork.com/six-sigma-quality/articles/a-painless-look-at-using-statistical-techniques-/.*

(Continued)

*Primary Examiner* — John Q Nguyen
*Assistant Examiner* — Michael Whalen
(74) *Attorney, Agent, or Firm* — Squire Patton Boggs (US) LLP

(57) ABSTRACT

A trouble diagnosis apparatus which supports reproduction of trouble according to a trouble code provided from an electronic control unit of the vehicle. The apparatus comprises means for extracting, for at least one of the trouble codes, characteristics unique to the trouble code with respect to respective driving parameters, means for extracting, from said driving data associated with a plurality of trouble codes, global characteristics associated with a plurality of said trouble codes with respect to each one of said driving parameters, and for said at least one of the trouble codes, means, based on similarity between the characteristics unique to the trouble code and said global characteristics, for setting the portion of the characteristics unique to the trouble code that have low similarity as the driving data for reproducing the trouble corresponding to the trouble code.

10 Claims, 5 Drawing Sheets

(56) References Cited

U.S. PATENT DOCUMENTS

| | | | |
|---|---|---|---|
| 8,099,308 B2* | 1/2012 | Uyeki | 705/5 |
| 8,301,333 B2* | 10/2012 | Singh et al. | 701/31.4 |
| 8,433,472 B2* | 4/2013 | Singh et al. | 701/31.4 |
| 8,463,485 B2* | 6/2013 | Howell et al. | 701/29.4 |
| 8,498,776 B2* | 7/2013 | Singh et al. | 701/33.4 |
| 8,527,441 B2* | 9/2013 | Singh | 706/45 |
| 8,554,403 B2* | 10/2013 | Tsuchikiri et al. | 701/29.1 |
| 8,676,432 B2* | 3/2014 | Patnaik et al. | 701/29.1 |
| 2004/0054507 A1* | 3/2004 | Mott | 702/196 |
| 2008/0004840 A1* | 1/2008 | Pattipatti et al. | 702/183 |
| 2008/0059120 A1* | 3/2008 | Xiao et al. | 702/184 |
| 2008/0119981 A1* | 5/2008 | Chen | 701/33 |
| 2008/0263399 A1* | 10/2008 | Cousin et al. | 714/26 |
| 2009/0055045 A1* | 2/2009 | Biswas et al. | 701/33 |
| 2009/0089134 A1* | 4/2009 | Uyeki | 705/9 |
| 2009/0265364 A1* | 10/2009 | Morgan et al. | 707/100 |
| 2009/0271066 A1* | 10/2009 | Underdal et al. | 701/35 |
| 2011/0029186 A1* | 2/2011 | Ishikawa | 701/30 |
| 2011/0118932 A1* | 5/2011 | Singh et al. | 701/33 |
| 2011/0137711 A1* | 6/2011 | Singh et al. | 705/7.38 |
| 2011/0144853 A1* | 6/2011 | Subramania et al. | 701/31 |
| 2011/0145026 A1* | 6/2011 | Singh et al. | 705/7.11 |
| 2011/0196572 A1* | 8/2011 | Tsuchikiri et al. | 701/35 |
| 2011/0238258 A1* | 9/2011 | Singh et al. | 701/33 |
| 2011/0313616 A1* | 12/2011 | Tsuchikiri et al. | 701/35 |
| 2012/0116630 A1* | 5/2012 | Howell et al. | 701/29.4 |

OTHER PUBLICATIONS

"Using Statistics to Determine Causal Relationships" by Jerome P. Reiter at http://www.stat.duke.edu/~jerry/Papers/causal.pdf.*
http://www.mathsisfun.com/data/histograms.html.*
Correlation and Causation, by Pete Ferderer (Feb. 24, 2005) at http://www.macalester.edu/qm4pp/Math%2018/presentations/Spring%202005/FerdererCausation.pdf.*
http://www.mathwords.com/s/step_function.htm.*
International Search Report and Written Opinion corresponding to International Application No. PCT/JP2010/001672 dated Apr. 13, 2010.
Chinese Office Action for corresponding Chinese Application No. 201080014474.1 dated Jun. 4, 2013.

* cited by examiner

DIAGNOSIS APPARATUS WHICH SUPPORTS FAULT REPRODUCTION, AND METHOD OF OUTPUTTING FAULT REPRODUCTION DATA

TECHNICAL FIELD

The present invention relates to the technology for diagnosing a trouble or failure for assisting a reproduction of a trouble about a broken-down vehicle.

BACKGROUND OF THE INVENTION

A diagnosis apparatus as a tool for diagnosing a trouble occurred in a vehicle is known in the prior art. But, knowing a cause of a trouble by reproducing the trouble or failure is helpful to repair the trouble. When a trouble of a vehicle introduced into an automobile repair shop cannot be reproduced, it is difficult to diagnose. Reproducing the trouble through trial and error by changing operating conditions such as vehicle speed and engine water temperature may be performed, but it requires a tremendous effort.

Patent literature 1 described that, with the use of driving data produced and stored in an electronic control unit when a trouble took place, the vehicle is driven in a trouble reproduction mode and the driving data acquired is compared with the driving data produced when the trouble took place. Matching of driving conditions is informed to a tester.

However, as driving data includes a large number of parameters, it is difficult to bring all parameters close to the parameters when the trouble took place. Further, if diagnosis of the trouble is done with very limited parameters, validity of the diagnosis is suspicious. The electronic control unit stores an array of instantaneous values of numerical values that are unique to the specific vehicle so that a range of values appropriates for a trouble diagnosis is hard to establish. Accordingly, the range of values appropriates for reproduction of a trouble is hard to establish.

From time to time, a diagnosis apparatus cannot determine what parameters are important for reproducing the trouble, thus, diagnosis has to rely on the skill of the engineers who perform diagnosis.

On the other hand, sometimes repair manual provides conditions for performing diagnosis in accordance with trouble codes. As the conditions are set according to general designing criteria, the range of numerical values is too large to focus, making diagnosis difficult.

DESCRIPTION OF THE PRIOR ART

Patent Literature

Patent Literature 1
JP 2805958

SUMMARY OF THE INVENTION

Problems to be Resolved by the Invention

Thus, a diagnosis apparatus capable of supporting reproduction of troubles of a vehicle and method for outputting trouble reproduction data are needed.

Means of Solving the Problem

A diagnosis apparatus of the present invention assists reproduction of troubles represented by trouble codes provided by an electronic control unit of a vehicle. From driving data for a plurality of driving parameters provided by the electronic control units of a plurality of failed vehicles, the diagnosis apparatus extracts characteristics unique to at least one of the trouble codes for each driving parameter. The diagnosis apparatus comprises means for extracting, from the driving data, global characteristic with respect to a plurality of trouble codes for each driving parameter. The diagnosis apparatus includes means for setting, for at least one trouble code, the portion of the characteristic unique to the trouble codes that has low similarity to the global characteristics as the driving data for reproducing the trouble according to the trouble code.

According to one embodiment of the present invention, characteristics of a trouble code are extracted from a histogram of driving data for each driving parameter, and a global characteristic is extracted from a histogram of each of driving parameters generated from driving data for multiple trouble codes.

According to another embodiment of the present invention, characteristics of trouble code and the global characteristics are represented by step functions.

According to another embodiment of the invention, driving data is provided for a predetermined period of a trouble period. The diagnosis apparatus, for a predetermined parameter, detects variation of the driving data for a predetermined time before the end of the driving data, and provides the variation as information for a reproduction of the trouble.

In one embodiment of the invention, driving parameters include a driving environment parameter that varies depending on operations by the users, a device environment parameter that varies according to automatic control of the vehicle, and a vehicle environment parameter that varies according to environment where the vehicle is.

In one embodiment of the invention, the diagnosis apparatus further comprises a means, responsive to input of a trouble code, for presenting driving data set by the means for setting as driving data for reproducing a trouble according to the trouble code.

The invention provides a method to present and output trouble reproduction data. This method, in diagnosis of a vehicle, is performed by a computer to output trouble diagnosis data for reproducing a trouble according to a trouble code representing the trouble provided from an electronic control unit of the vehicle. From driving data relating to a plurality of driving parameters that are provided from respective electronic control units of a large number of failed vehicles, with respect to at least one trouble code, characteristic data are extracted that are unique to the trouble code for respective driving parameters. Also, global data that are extracted from the driving data relating to the plurality of trouble codes to represent global characteristics relating to a plurality of trouble codes for respective driving parameters. Based on the characteristic data and the global data, similarities of the characteristics unique to the trouble code and the global characteristics are computed for at least one of the trouble codes.

For at least one trouble code, the portion of characteristics unique to the trouble code that have low similarities is output for the driving data for reproducing the trouble corresponding to the trouble code.

According to the invention, a technician of a service shop of the vehicles, by entering a trouble code to a computer, can acquire driving data suited to reproduce the trouble corresponding to the trouble code.

DETAILED DESCRIPTION OF PREFERRED EMBODIMENTS

Figure 1:
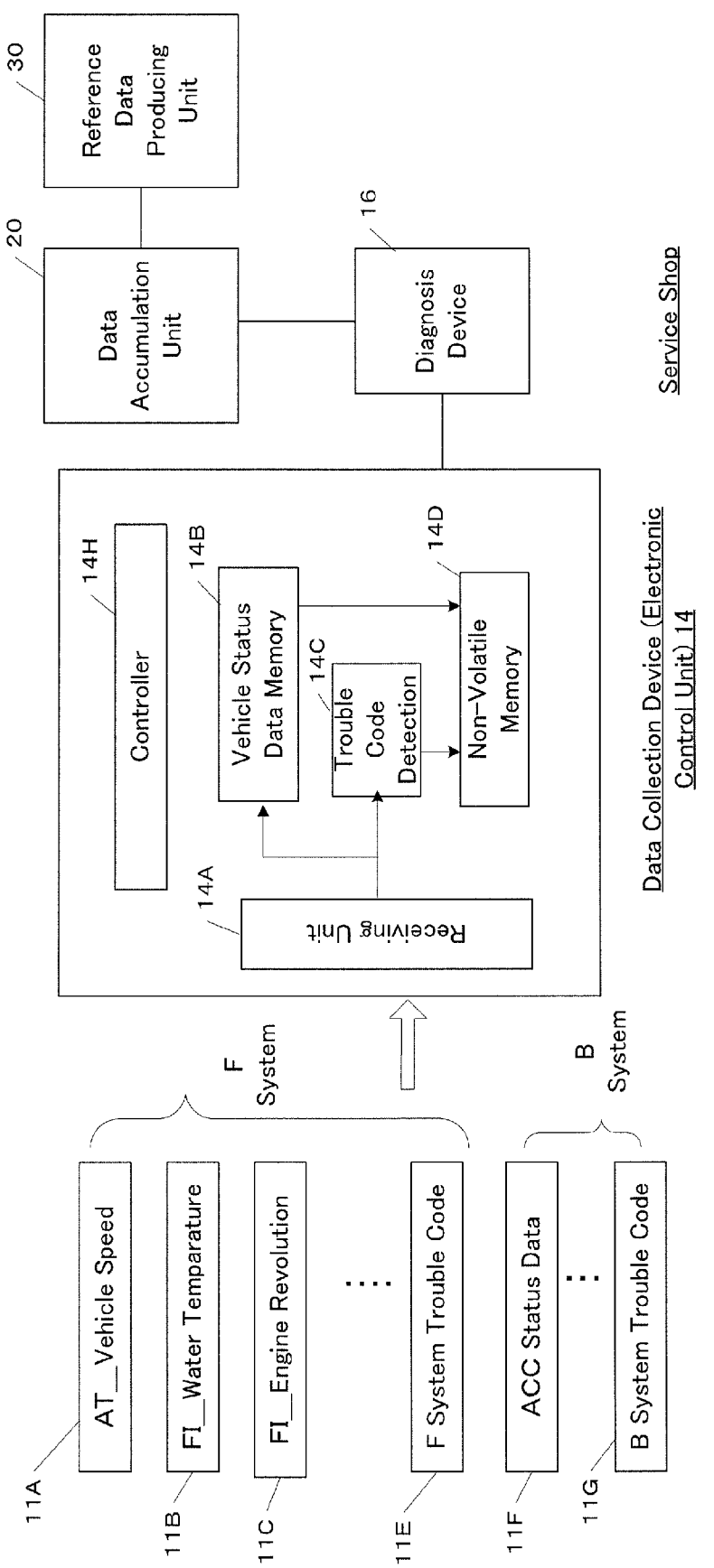
FIG. 1 is a general configuration diagram of illustrating a relationship between a diagnosis apparatus and a vehicle according to the invention.

An embodiment of the present invention will be described below with reference to the drawings. FIG. 1 shows a data collection unit 14 included in an electronic control system of a vehicle on which the present invention is based. A vehicle-mounted network 11 is a network for making communication between a plurality of electronic control units (ECU) mounted on the vehicle. In the embodiment, the network is divided into two systems such as F system and B system, but it may have only one system. The F system network is a network for making communication among a plurality of ECUs, which are so-called control systems, such as ECU for performing fuel ignition control and ignition timing control of an engine, ECU for controlling a transmission and ECU for performing brake control. The B system network is a network for making communication among a plurality of ECUs, which are so-called body's electric components system, such as ECU for controlling power windows or door locks, ECU for controlling lights, and ECU for controlling electric components such as air conditioner. The ECUs are basically computers, each of which is configured of a microprocessor and a communication module.

The F system network sends control system data such as vehicle speed data 11A, engine water temperature data 11B and engine revolution speed data 11C, and a trouble code 11E indicative of a trouble detected by the ECU to the data collection unit 14. The B system network sends'data from a body's electric component ECU such as data 11F indicative of the state of an accessory (ACC) such as air conditioner, and a trouble code 11G indicative of a trouble detected by the ECU to the data collection unit 14.

The data collection unit 14 itself is an ECU. The data collection unit 14 is controlled by a controller 14H whose main element is a microprocessor. A receiving unit 14A sequentially receives the latest data indicative of a state of the vehicle from the vehicle-mounted network 11, and the controller 14H sequentially and temporarily stores the data in a vehicle state data memory 14B. The vehicle state data memory 14B is a random access memory (RAM) and stores therein the latest data having a predetermined time interval of 20 seconds, for example, which is sequentially rewritten with new data every 0.2 second in first-in first-out (FIFO) shift register system.

A nonvolatile memory 14D is configured of a backup memory for maintaining the memory that a hold current is supplied by a buttery also during power-off, or a rewritable ROM such as EEPROM. When receiving a trouble code (DTC; Diagnosis Trouble Code), the controller 14H reads data for 15 seconds before the trouble code occurs from the vehicle state data memory 14B and stores it in the nonvolatile memory 14D. The data is called onboard snap shot (OBS). The processing is executed each time a trouble code occurs, and the nonvolatile memory 14D stores a plurality of OBSs corresponding to a plurality of trouble codes.

When the vehicle is brought to a service shop for inspection and repair, a service staff connects a connection terminal of a trouble diagnostic unit 16 to the output terminals of the ECUs to read the data stored in the nonvolatile memory 14D into the diagnostic unit and to extract reference normal value data corresponding to the inspection data, and compares the values of the respective driving parameters thereby to make a trouble diagnosis utilizing the diagnostic unit.

On the other hand, the data read out from nonvolatile memory 14D are accumulated in data accumulation unit 20 for use in setting reference data for reproducing troubles. Reference data creation unit 30 is provided in association with data accumulation unit 20.

The data stored in nonvolatile memory 14D may be transmitted from an on-board communications apparatus to the data accumulation unit without waiting for the vehicle to be brought to a service shop for a trouble diagnosis and other services.

Table 1 shows the exemplary OBSs stored in the nonvolatile memory 14D in response to a trouble code occurrence. In this example, the driving parameters are denoted as R (engine revolution), V (vehicle speed) and T (temperature of engine cooling water). Actually, the data on a large number of (50 to 60 depending on a vehicle type, for example) parameters such as an output value of air/fuel ratio sensor, an output value of 02 sensor, a fuel injection time and an air/fuel ratio is contained in the OBSs, which are indicated as P4, P5, P6, . . . .

Time is indicated using a minus sign with a time 0.2 second before assuming that the occurrence time of the trouble code is 0 second as reference.

TABLE 1

| Time (sec) | Temperature sensor (V) | AF sensor (mA) | Fuel injection (ms) | | | |
|---|---|---|---|---|---|---|
| −14.8 | 0.71 | 0 | 2.96 | | | |
| −14.6 | 0.71 | 0 | 2.96 | | | |
| −14.4 | 0.71 | 0 | 2.94 | | | |
| ... | ... | ... | ... | | | |
| ... | ... | ... | ... | | | |
| ... | ... | ... | ... | | | |
| ... | ... | ... | ... | | | |
| ... | ... | ... | ... | | | |
| −3 | ... | ... | ... | | | |
| −2.8 | ... | ... | ... | | | |
| −2.6 | ... | ... | ... | | | |
| −2.4 | ... | ... | ... | | | |
| −2.2 | ... | ... | ... | | | |
| −2 | ... | ... | ... | | | |
| −1.8 | ... | ... | ... | | | |
| −1.6 | ... | ... | ... | | | |
| −1.4 | ... | ... | ... | | | |
| −1.2 | ... | ... | ... | | | |
| −1 | 0.71 | 0 | 2.93 | | | |
| −0.8 | 0.71 | 0 | 2.93 | | | |
| −0.6 | 0.69 | 0 | 2.91 | | | |
| −0.4 | 0.69 | 0 | 2.87 | | | |
| −0.2 | 0.69 | 0 | 2.88 | | | |
| 0 | 0.69 | 0 | 2.89 | | | |

Figure 2:
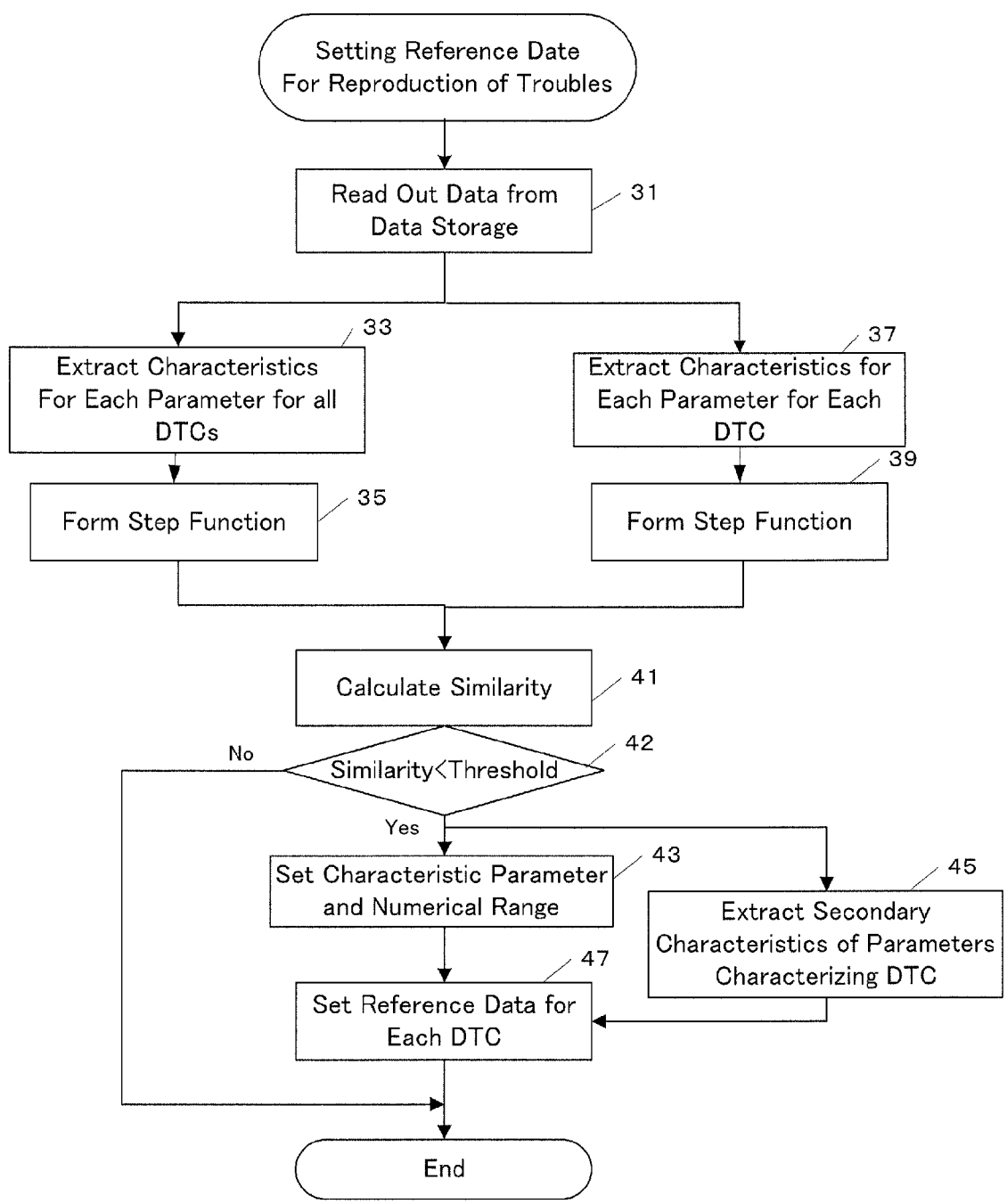
FIG. 2 is a flow chart illustrating a process of one embodiment of the invention and a functional block diagram of a reference data generator.

Referring to FIG. 1 and FIG. 2, a process of setting data for reproducing a trouble will be described. When a vehicle is brought to a service shop, a staff connects a terminal device of trouble diagnosis apparatus 16 to data collection unit 14 of a vehicle and reads out data stored in nonvolatile memory 14D. The data read out is transmitted to a support center via a network, and a set of trouble code (DTC: Diagnosis Trouble Code) and OBS (onboard snap shot) data corresponding to the DTC are stored in data accumulation unit 20. The set of data is accumulated in data accumulation unit 20. Sets of DTC/OBS data in the order or a few thousand to several tens of thousands are accumulated in data accumulation unit 20.

Reference data creation unit 30 is a general-purpose computer and performs a process illustrated in FIG. 2 for data accumulated in data accumulation unit 20 to generate the reference data. FIG. 2 illustrates one embodiment of a flow of a process, and is also a block diagram of the configuration of reference data creation unit 30. The process in FIG. 2 is performed for each type of vehicles and the reference data are generated for respective types of vehicles.

Data reading out unit 31 reads out all OBS data for all DTC stored in data accumulation unit 20 for a given type of vehicles. Characteristics extraction unit 33 is provided to extract characteristics for each parameter for all DTC and collects the last lines of OBS data, that is data in time 0 in table 1, for each driving parameter, and extracts the range of characteristic data values from a histogram of the number of entries for respective data values.

Figure 3:
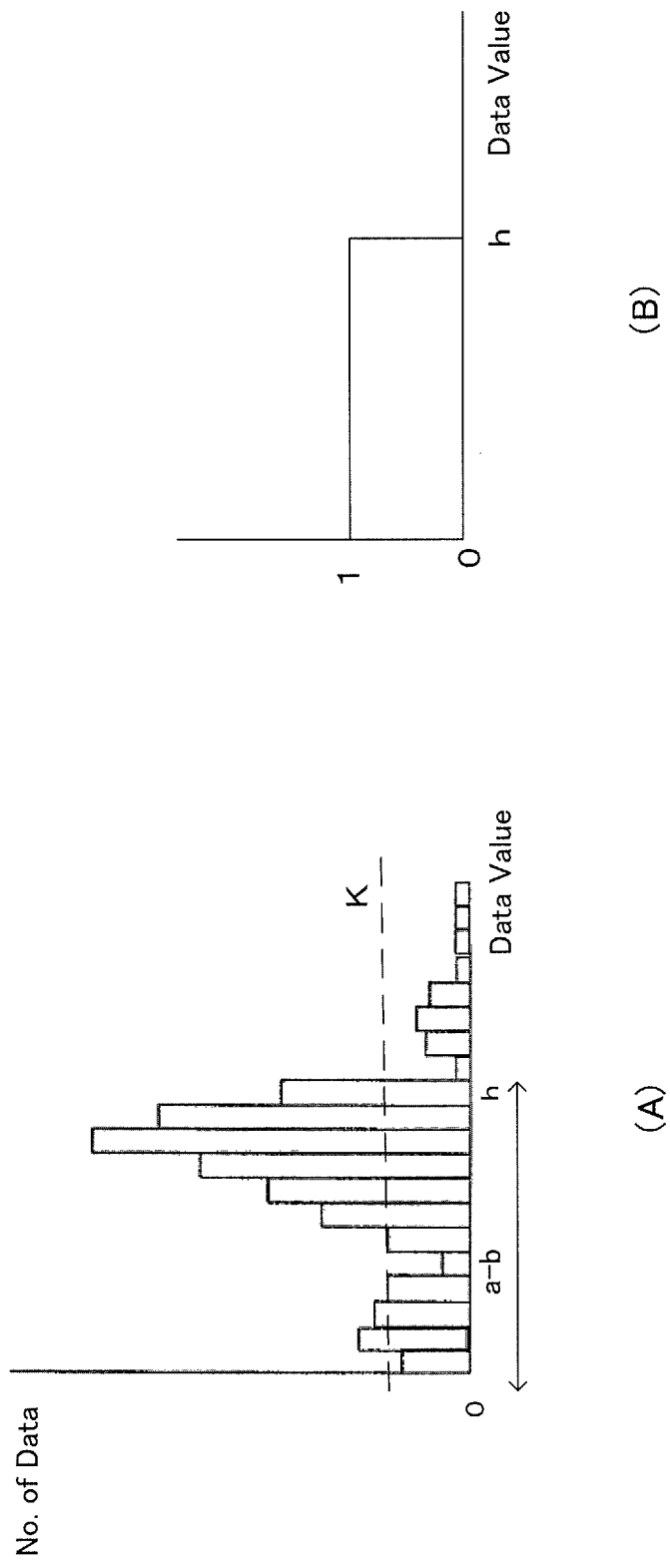
FIG. 3 represent diagrams illustrating a relationship between histogram and step function.

FIG. 3 is a histogram of OBS data relating to all DTCs for a given driving parameter. In this embodiment, the range of data values exceeding the number K of entries is the characteristic range of the driving parameter. In the embodiment of FIG. 3(A), the range of data values from 0 to h is the characteristic range. The number of entries for data values a to b does not reach the threshold K. Here, the characteristic range discontinues. For the sake of efficient calculation, in this embodiment, the range is made to continue to produce a block of characteristic range.

Step function unit 35 converts the characteristic range extracted in this way to a step function shown in FIG. 3(B). In this embodiment, the step function is 1 in the range of data values 0 to h, and is 0 for the other range of data values. A step function is defined for respective driving parameters based on OBS data relating to all DTCs. If there are m driving parameters (m is an integer), step functions f1, f2, f3, ... fm are generated. A step function based on all DTCs for a driving parameter is represented by f(x). The step function f(x) is an array of numerical values 1 and 0.

Characteristic extraction unit 37 extracts characteristics for each parameter and for each DTC. For OBS data stored in data accumulation unit 20 for a given type of vehicles, characteristic extraction unit 37 collects data of the last lines of table 1, that is, data at time 0 for each of DTC and parameters. Characteristic extraction unit 37 extracts a characteristic range of data values from a histogram of the number of entries respective data values using the same method as described above with reference to FIG. 3(A). Step function unit 39 converts the characteristic range extracted in this way to a step function. The step function for each DTC and for each driving parameter is shown by g(x). The step function g(x) is an array of numerical values 1 and 0.

Similarity calculation unit 41 calculates a similarity between the step function g(x) for each DTC and the characteristic function f(x) on the basis of all DTCs for the same parameter according to the following formula.

$$\text{Similarity} = \frac{\int f(x)g(x)dx}{\sqrt{\int |f(x)|^2 dx}\sqrt{\int |g(x)|^2 dx}} \quad (1)$$

The definition of similarity or "similarity of characteristic range" used here is based on the concept of inner product. For discrete parameters, similarity can be represented by the value of cosine of the angle of vectors that is calculated by an inner product of the vectors. The above formula extends it to a continuous parameter.

For discrete parameters, similarity can be represented by the following formula for vectors V and W.

$$\cos\theta = \frac{V \cdot W}{|V||W|} \quad (2)$$

When the vectors are oriented to similar directions, the value is close to 1, and when the vectors are close to orthogonal, the value is close to 0.

V represents the ratio appearance of a parameter of discrete values to the overall appearance and W is the ratio of appearance of a certain DTC, formula 2 may be used. For example, a parameter assumes the values 1, 2, 3, 4 and the appearance ratio in the overall appearance is 1:1:1:3, and further the appearance ratio in DTC is 0:0:0:1, then V=(1, 1, 1, 3), W=(0, 0, 0, 1) and the value of cosine (similarity) is approximately 0.86.

Formula 1 is for "continuous value parameter" where characteristic range is continuous. Thus, an inner product in ordinary vector space as represented by formula 2 may not be used. Here, the characteristic range is redefined as "a function that has 1 in the characteristic range and 0 in the other range". Then, an inner product may be defined by the following formula.

$$f \cdot g_1 = \int f(x)g(x)dx \quad (3)$$

Formula 1 utilizes this inner product and the magnitude (norm) determined by the inner product to determine the value of cosine in the same manner as in the ordinary vector space.

If f and g are rectangular function as described above, the value of the denominator of formula 1 is the magnitude of the range shared by f and g. And the numerator is calculated by multiplying the respective square roots of the magnitude of the respective ranges of f and g. The more the ranges of f and g are overlapped, the value is closer to 1. If the ranges of f and g do not overlap at all, the value is 0. This value indicates similarity of the characteristic ranges.

An adequate formula for similarity may be represented as follows wherein the magnitude (Norm) is defined by an inner product:

$$\cos\theta = \frac{\int f(x)g(x)dx}{\sqrt{\int f^2(x)dx}\sqrt{\int g^2(x)dx}} \quad (4)$$

When similarity between the step function of a certain parameter for a given DTC and the step function of the parameter for all DTC is large, it means that the parameter does not characterize the DTC. In contrast, when the step function of a certain parameter for a given DTC and the step function of the parameter for all DTC is small, it means that the parameter exhibits unique behavior of the DTC and thus characterizes the DTC.

When the similarity is calculated, whether the similarity is smaller than a threshold value is determined in block 42. When the similarity is smaller than the threshold, the unit for setting characteristic parameters and the range of the numerical values 43 sets such parameters and characteristic range of the data values as the parameter and the characteristic range of the data values characterizing the DTC. When the similarity is larger than the threshold, the process exits the process for this DTC and a process for the next DTC begins.

For the parameters for which similarity is determined to be smaller than the threshold in block 42, a secondary characteristic extraction unit 45 extracts secondary characteristics. Referring to table 1, secondary characteristic extraction unit 45 calculates an inclination of variation of data values during the period that DTC took place, that is, the period from time 0 to three seconds before time 0 in table 1 (this period is shown at the right side of table 1 by curved brace). The inclination data are included in the reference data as attribute of the parameter in the DTC. For example, when the parameter is engine revolution or a vehicle speed, positive inclination of the data values for the three seconds indicates acceleration and negative inclination indicates deceleration.

Inclination of data values is calculated by differentiating an amount of change. For example, the inclination may be calculated by the following formula.

$$\frac{\lim(f(x+h) - f(x))}{h} \quad (5)$$

Thus, for each DTC, the characteristic parameters and the range of numerical values set by the unit for setting the characteristic parameters and the range of numerical values 43, and secondary characteristics extracted by secondary characteristics extraction unit 45 for this characteristic parameter are set by reference data setting unit 47, and are stored in a storage device of a computer in the support center.

Individual service shops access the system in the support center via a network to perform a trouble diagnosis using the reference data. A service shop can access the system in the support center using the shop's personal computer via a network and may use the reference data online. Or, a service shop may download the reference data into diagnosis apparatus 16 in the service shop from the support center to use the reference data.

One example of the process performed by a unit 43 for configuring characteristic parameters and the range of the numerical values will be described. From data accumulated in data accumulation unit 20, for a large number of OBS data relating to a DTC, the last values of a parameter, that is, data values at time 0 in Table 1 are collected and a histogram of the number of entries is created. Table 2 shows one example. In this example, the number of entries is one hundred.

TABLE 2

| The range of data values | The number of entries |
|---|---|
| 0.0-0.1 | 22 |
| 0.1-0.2 | 0 |
| 0.2-0.3 | 0 |
| 0.3-0.4 | 18 |
| 0.4-0.5 | 30 |
| 0.5-0.6 | 14 |
| 0.6-0.7 | 2 |
| 0.7-0.8 | 0 |
| 0.8-0.9 | 9 |
| 0.9-1.0 | 5 |

Figure 4:
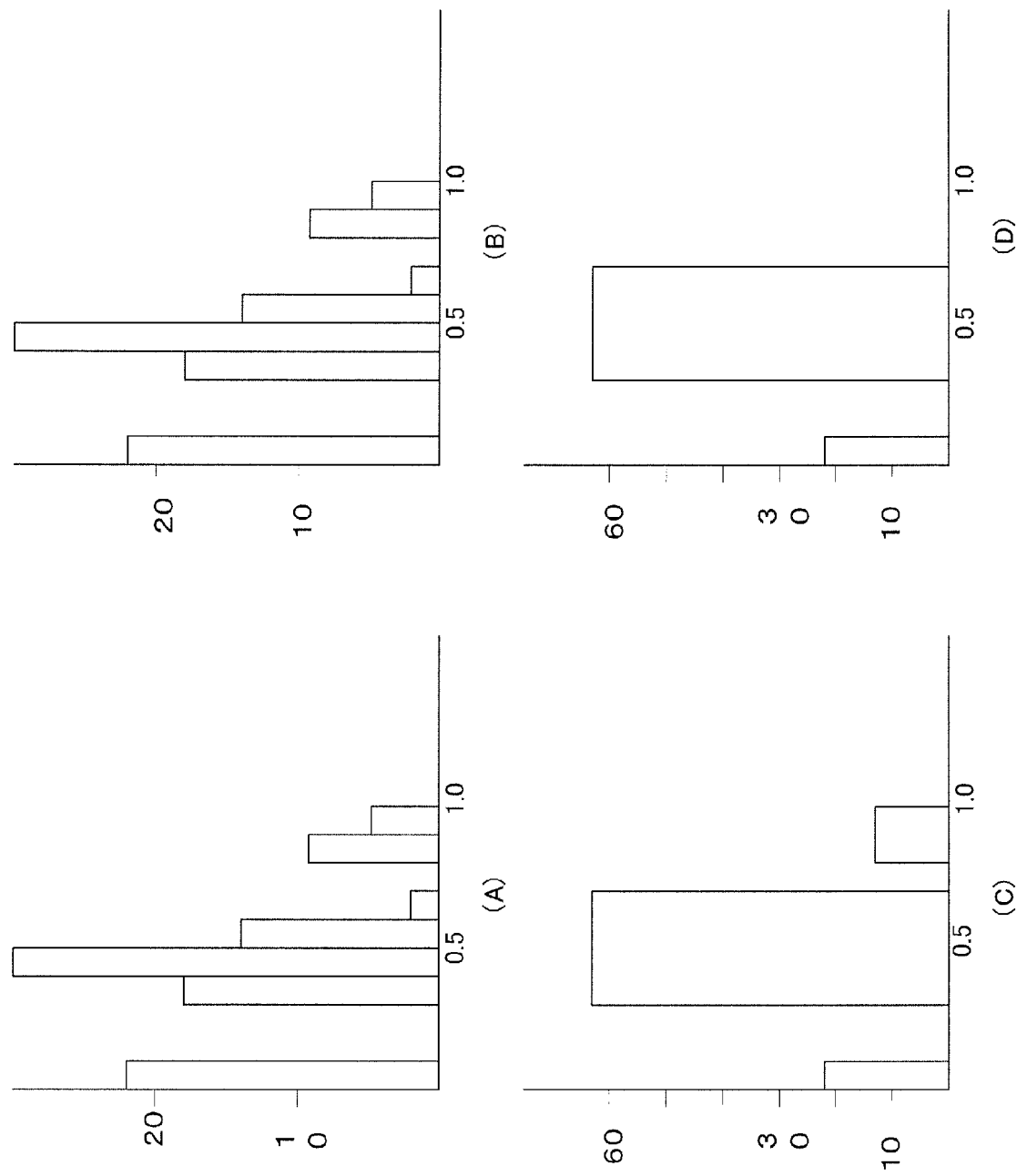
FIG. 4 represent diagrams illustrating deformation process of histogram.

Bars of data value that do not exceed a % of a total number of entries are deleted. If a % is 1%, the bars of the number of entries that do not exceed 1 are deleted. This operation results in bars shown in Table 3. In the examples shown in FIG. 4, the histogram shown in FIG. 4(A) is converted to the histogram shown in FIG. 4(C).

TABLE 3

| The range of data values | The number of entries |
|---|---|
| 0.0-0.1 | 22 |
| 0.3-0.4 | 18 |
| 0.4-0.5 | 30 |
| 0.5-0.6 | 14 |
| 0.6-0.7 | 2 |
| 0.8-0.9 | 9 |
| 0.9-1.0 | 5 |

Adjacent bars are combined and grouped in the remaining bars. In this example, the bars are grouped as shown in table 4.

TABLE 4

| Group ID | The range of data values | The number of entries |
|---|---|---|
| 1 | 0.0-0.1 | 22 |
| 2 | 0.3-0.7 | 64 |
| 3 | 0.8-1.0 | 14 |

The groups having the total number of counts of b % or less are deleted. For example, the groups having 20% or less are deleted, the group having the group ID of 3 is deleted and the groups in table 5 remain. In the example of FIG. 4, the processing proceeds from the histogram of FIG. 4B to the histogram of FIG. 4D.

TABLE 5

| Group ID | The range of data values | The number of entries |
|---|---|---|
| 1 | 0.0-0.1 | 22 |
| 2 | 0.3-0.7 | 64 |

The range of data values of 0.0-0.1 and 0.3-0.7 are the characteristic range of this parameter. The two ranges are combined into a single range of numerical value of 0.0-0.7, which is assumed to be the characteristic range of numerical value that provides reference data for this parameter.

A specific example of a process performed by characteristic extraction unit 33 that extracts characteristics for respective parameters for all DTCs and characteristics extraction unit 37 that extracts characteristics for respective DTCs and for respective parameters is described along with the process for calculating similarity.

Table 6 is a table of the last values of battery voltages collected from OBS data for all DTCs. The left column indicates central values in the width of data values in the horizontal axis for creating a histogram, that is, the width of bars in a histogram. In this example, the total number of entries is 901. When one OBS data is provided from one vehicle, it means that data are collected from 901 vehicles. However, the total number of entries does not always correspond to the number of vehicles because multiple OBS data may be provided from one vehicle.

Table 7 is a table of the last values of battery voltages collected from OBS data for DTC "P3608". The central values show the values of the center the ranges of data values, similar to Table 6. In this example, the total number of entries is 12. When one DTC "P3608" is provided from one vehicle, ODS data for DTC "P3608" are collected from twelve vehicles.

TABLE 6

| Central Values of the ranges of data values | The number of entries |
|---|---|
| 5.6 | 6 |
| 6.1 | 5 |
| 6.6 | 4 |
| 7.1 | 3 |
| 7.6 | 0 |
| 8.1 | 1 |
| 8.6 | 2 |
| 9.1 | 0 |
| 9.6 | 0 |
| 10.1 | 0 |
| 10.6 | 3 |
| 11.1 | 12 |
| 11.6 | 66 |
| 12.1 | 126 |
| 12.6 | 133 |
| 13.1 | 34 |
| 13.6 | 166 |
| 14.1 | 312 |
| 14.6 | 22 |
| 15.1 | 1 |
| Total | 901 |

TABLE 7

| Central values | The number of entries |
|---|---|
| 5.4 | 1 |
| 5.5 | 0 |
| 5.6 | 0 |
| 5.7 | 0 |
| 5.8 | 2 |
| 5.9 | 1 |
| 6 | 0 |
| 6.1 | 0 |
| 6.2 | 0 |
| 6.3 | 3 |
| 6.4 | 1 |
| 6.5 | 2 |
| 6.6 | 0 |
| 6.7 | 1 |
| 6.8 | 0 |
| 6.9 | 1 |
| Total | 12 |

TABLE 8

| Central values | The number of entries |
|---|---|
| 11.1 | 12 |
| 11.6 | 69 |
| 12.1 | 126 |
| 12.6 | 133 |
| 13.1 | 34 |
| 13.6 | 168 |
| 14.1 | 312 |
| 14.6 | 22 |

TABLE 9

| Central values | The number of entries |
|---|---|
| 5.8 | 2 |
| 5.9 | 1 |
| 6.3 | 3 |
| 6.4 | 1 |
| 6.5 | 2 |

When a is 1% and b is 20% in the scheme of extracting characteristic ranges described with reference to table 3-5, Table 6 transforms to Table 8 and Table 7 transforms to Table 9. When Table 8 and Table 9 are converted into step functions, Table 7 forms a step function f(x) wherein the range of data values is from 11.1 to 14.6 and Table 9 forms a step function g(x) wherein the range of data values is from 5.8 to 6.5.

Figure 5:
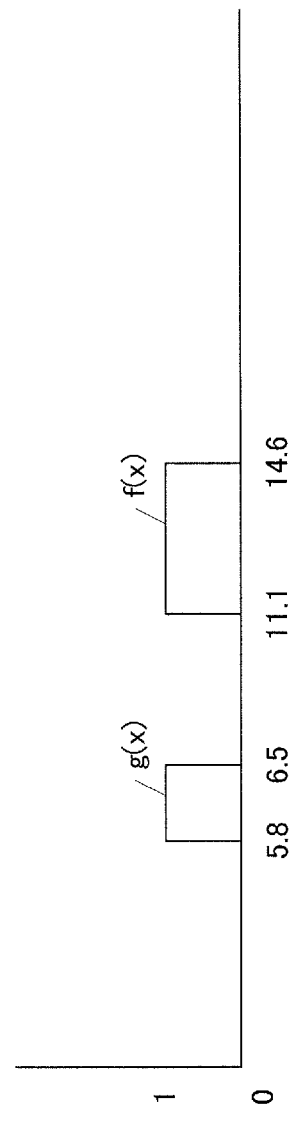
FIG. 5 is a diagram exemplifying a relationship of the two step functions.

FIG. 5 shows the relationship of these two step functions. Similarity of the two functions is calculated by formula 1 described above. For the example of FIG. 5, there is not a range where two functions overlap so that the numerator of fractional formula 1 is 0. Thus, the similarity is 0. The low similarity means that the relevant parameter characterizes DTC "P3608". In this example, the threshold for determination is 0.5. The parameter having a similarity equal to or lower than 0.5 is determined to characterize the DTC.

Accordingly, responsive to an inquiry about DTC "P3608" from a technician performing diagnosis in a service station, the name of this parameter and the range of data values corresponding to the extracted characteristic range may be presented for reproducing a trouble. In this example, DTC "P3608" is characterized by the parameter of battery voltage, and the range of characteristic data is 5.8-6.5 V.

Now, integer value parameters are described whose data values are binary, that is, two values of 0 and 1. The integer value parameters include on/off signal for the switch of an air-conditioner, on/off signal of brake switch and other switches.

For all DTCs, with respect to the integer value parameters at issue, the last values of all OBS data are collected to determine appearance ratio of 0 and 1 respectively. Assume that the ratio was 9 to 1, vector f(0.9, 0.1) represent this condition.

Next, for OBS data relative to a given DTC, the last values of the integer parameters are collected to determine appearance ratio of 0 and 1 respectively. Assume that the ratio was 1 to 9, vector g(0.1, 0.9) represent this condition.

Similarity of the two vectors may be represented by a correlation coefficient r, which may be calculated by the following equation:

$$r = \cos\theta = \frac{\vec{f} \times \vec{g}}{|\vec{f}| \times |\vec{g}|} \qquad (6)$$

As an example, for a parameter of a PNP switch, collection of OBS data for all DTCs results in Table 10, and collection of data for DTC "P8630" results in Table 11. Appearance ratios f and g are determined from this table and correlation coefficient or similarity is calculated with formula 6, which is 0.675. The threshold for determining similarity is assumed to be 0.7, then, the parameter of PNP switch is determined to be a characteristic parameter having a strong relation to generation of DTC "P8630". Thus, responsive to an inquiry from a service shop relative to DTC "P8630", the name of parameter "PNP switch" and the extracted characteristic range, appearance ratio "1 to 9", are presented for reproducing the trouble.

This parameter and the appearance ratio of the data values are set as reference data for respective DTCs by the unit 47 for setting reference data and are stored in a storage device of the computer in the support center.

TABLE 10

| Data Values | The number of entries |
|---|---|
| 0 | 469 |
| 1 | 432 |
| Total | 901 |

TABLE 11

| Data Values | The number of entries |
|---|---|
| 0 | 0 |
| 1 | 9 |
| Total | 9 |

In a similar manner as the above mentioned two examples, characteristic parameters and the ranges of data values are set for presentation.

There may be plurality of characteristic parameters for one DTC.

In the above two examples, for the sake of simplicity, "one parameter for one DTC" was assumed. A plurality of parameters may relate to one DTC and a plurality of parameter names may be presented. In such a case, the ranges of data values and/or appearance ratio are set for respective parameters so that the trouble may be reproduced with combined conditions.

Specific embodiments of the present invention were described above, which should not be regarded as limiting the scope of the present invention.

The invention claimed is:

1. A trouble diagnosis apparatus for supporting reproduction of trouble on the basis of at least one of diagnosis trouble codes provided by an electronic control unit provided onboard a vehicle, each of the diagnosis trouble codes representing a trouble, the trouble diagnosis apparatus configured to:

extract unique characteristics that are unique to at least one of the diagnosis trouble codes from driving data read out from electronic control units of a plurality of vehicles in trouble, for each driving parameter;

extract global characteristics that are characteristics relating to a plurality of the diagnosis trouble codes from said driving data read out from the electronic control units of the plurality of vehicles in trouble, for each driving parameter; and for a given diagnosis trouble code, determine similarity between the unique characteristics unique to the given diagnosis trouble code and the global characteristics, out of one or more unique characteristics unique to the given diagnosis trouble code, select one or more unique characteristics that have low similarity relative to the global characteristics as the driving data for reproducing the trouble corresponding to the given diagnosis trouble code, and present the one or more selected unique characteristics for reproducing the trouble.

2. The trouble diagnosis apparatus of claim 1, wherein the unique characteristics unique to respective ones of the diagnosis trouble codes are extracted from histograms of driving data for respective driving parameters, and the global characteristics are extracted from histograms for respective driving parameters that are produced from the driving data for a plurality of the diagnosis trouble codes.

3. The trouble diagnosis apparatus of claim 2, wherein said unique characteristics and said global characteristics are represented by step functions respectively.

4. The trouble diagnosis apparatus of claim 1, wherein said driving data are data for a predetermined period when a trouble took place, and wherein said trouble diagnosis apparatus is further configured to:

detect, for given parameters, variation of the driving data from the last in said predetermined period to the time that is a predetermined time before the last; and provide the variation of the driving data as a part of information for reproducing the trouble.

5. The trouble diagnosis apparatus of claim 1, wherein said driving parameters include driving environment parameter that varies depending on operations by a user, device environment parameter that varies by automatic control of the vehicle, and vehicle environment parameter that varies with the environment where the vehicle is placed.

6. In diagnosis of troubles of vehicles, a computer implemented method of presenting trouble diagnosis data for supporting reproduction of trouble on the basis of at least one of diagnosis trouble codes provided by an electronic control unit provided onboard a vehicle, each of the diagnosis trouble codes representing a trouble, the method comprising the steps of:

extracting unique characteristics of respective driving parameters that are unique to respective ones of the diagnosis trouble codes from driving data read out from electronic control units of a plurality of vehicles in trouble, for each driving parameter;

extracting global characteristics that are characteristics relating to a plurality of the diagnosis trouble codes from said driving data read out from the electronic control units of the plurality of vehicles in trouble, for each driving parameter;

determining, for a given diagnosis trouble code, similarity between the unique characteristics unique to the given diagnosis trouble code and the global characteristics; and out of unique characteristics unique to the given diagnosis trouble code, presenting one or more unique characteristics that have low similarity to the global characteristics as the driving data for reproducing the trouble corresponding to the given diagnosis trouble code.

7. The computer implemented method of claim 6, wherein the unique characteristics are extracted from histograms of driving data for respective driving parameters, and the global characteristics are extracted from histograms for respective driving parameters that are produced from the driving data for a plurality of the diagnosis trouble codes.

8. The computer implemented method of claim 7, wherein the unique characteristics and the global characteristics are represented by step functions.

9. The computer implemented method of claim 6, wherein said driving data are data in a predetermined period when a trouble took place, and wherein said method further comprising the step of:

detecting, for a given parameter, variation of the driving data from the last in the predetermined time to the time that is a predetermined time before the last, and providing the variation of the driving data as a part of information for reproducing the trouble.

10. The computer implemented method of claim 6, where said driving parameters include driving environment parameter that varies depending on operations by a user, device environment parameter that varies by automatic control of the vehicle, and vehicle environment parameter that varies with the environment where the vehicle is placed.

* * * * *